(12) United States Patent
Chen et al.

(10) Patent No.: US 12,657,685 B1
(45) Date of Patent: Jun. 16, 2026

(54) WAFER OPTICAL INSPECTION SYSTEM AND INSPECTION METHOD

(71) Applicant: Powerchip Semiconductor Manufacturing Corporation, Hsinchu (TW)

(72) Inventors: Ke-Fen Chen, Hsinchu (TW); Yu-Chih Lin, Hsinchu (TW); Lin-Ho Ko, Hsinchu (TW); Po-Yang Chen, Hsinchu (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 0 days.

(21) Appl. No.: 19/070,473

(22) Filed: Mar. 4, 2025

(30) Foreign Application Priority Data

Feb. 19, 2025 (TW) ................................. 114105989

(51) Int. Cl.
| | |
|---|---|
| *G06T 7/00* | (2017.01) |
| *G01N 21/88* | (2006.01) |
| *G01N 21/95* | (2006.01) |
| *G06T 7/73* | (2017.01) |
| *G06V 10/145* | (2022.01) |
| *G06V 10/75* | (2022.01) |

(52) U.S. Cl.
CPC ....... *G06T 7/0004* (2013.01); *G01N 21/8851* (2013.01); *G01N 21/9501* (2013.01); *G06T 7/73* (2017.01); *G06V 10/145* (2022.01);

*G06V 10/751* (2022.01); *G01N 2021/8887* (2013.01); *G06T 2207/30148* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 2018/0176549 A1* | 6/2018 | Chang | .................. | H04N 13/351 |
| 2022/0148201 A1* | 5/2022 | Huang | .................... | G06T 7/337 |
| 2023/0005162 A1* | 1/2023 | Nakano | ..................... | G06T 7/90 |

FOREIGN PATENT DOCUMENTS

| | | |
|---|---|---|
| CN | 203950789 U | 11/2014 |
| TW | 434658 | 5/2001 |
| TW | M659479 U | 8/2024 |

* cited by examiner

*Primary Examiner* — Talha M Nawaz
(74) *Attorney, Agent, or Firm* — Winston Hsu

(57) ABSTRACT

A wafer optical inspection system, including an image capturing device, which consists of a photosensitive device, an LED source and a laser source. The LED source generates a reflective feature at the edge of a batch wafers, and the laser source generates a contour feature at the edge of the batch wafers. The photosensitive device captures a wafer image alongside with the reflective feature and the contour feature to form a side image of the wafer group. An image recognition device identifies the number of wafers and their positions in the batch based on the side image of the wafer group.

15 Claims, 17 Drawing Sheets

WAFER OPTICAL INSPECTION SYSTEM AND INSPECTION METHOD

BACKGROUND OF THE INVENTION

1. Field of the Invention

This invention generally relates to a wafer optical inspection system, and more specifically, to a wafer optical inspection system and inspection method that utilizes a hybrid light source combining both light-emitting diode (LED) and laser technologies.

2. Description of the Prior Art

In the semiconductor industry, wafers are generally placed in a wafer cassette inside a standard mechanical interface box (SMIF, referred hereinafter as the wafer box) or a front-opening wafer transfer box (FOUP, referred hereinafter as the wafer box), ensuring that the wafers are not damaged, contaminated, or subjected to electrostatic interference during storage and transportation. This plays an important role in semiconductor processes. The wafer cassette is provided with multiple slots, which are precisely designed in shape and spacing to ensure that the wafers are securely placed inside. Each slot typically accommodates a single wafer. During the manufacturing process, the selected wafer is transferred between equipment and/or chambers via a robotic arm to reduce human error and improve production efficiency. Due to process automation, the number and position of the wafers on the cassette are pre-inspected before entering the equipment or chamber to avoid issues such as broken wafers, skipped wafers, or skewed wafers during the process due to incorrect wafer information or abnormal wafer positioning.

Taking a wet bench equipment as an example, the wafer box is first placed at the loading/unloading port of the equipment. In this stage, the equipment inspects the wafer box to determine the number and position of the wafers on the cassette, checking for issues such as broken wafers, missing wafers, or abnormal positions. Only after this inspection will the robotic arm begin transferring the wafers. The wet bench equipment typically has multiple process tanks, and wafers are moved in and out of each process tank by the robotic arm. Batch processing is commonly used, where all wafers in the wafer box enter the process tanks simultaneously for treatment. If an incorrect movement occurs with the robotic arm or a process anomaly arises, it may cause abnormal positioning of the wafers on the cassette, such as broken wafers, missing wafers, or skewed wafers. However, due to limitations in wafer transfer methods and space restrictions in typical wet bench equipment, inspection tools, such as optical fiber sensors (which require movement in space), cannot be installed inside the process tanks. Therefore, it is impossible to detect if the wafers' positions on the cassette are abnormal while inside the process tanks. As a result, if issues like broken wafers, missing wafers, or misalignment occur inside or between the process tanks, subsequent robotic arm movements can easily collide with the wafers, causing secondary damage or even breaking the wafers.

SUMMARY OF THE INVENTION

In view of the issues that are prone to occur in the prior art, the present invention hereby proposes a wafer optical inspection system, which is characterized by using a hybrid light source to generate reflective features and contour features on the wafer's edge. By cooperating in capturing the wafer's side image, this system enables point-based detection of the quantity and position of batch wafers within the process tank zone, effectively solving the issue in prior art where wafer information remains undetectable during the process.

One aspect of the present invention is to provide a wafer optical inspection system, installed in an equipment, wherein the equipment includes at least one process zone for placing a wafer group of batch wafers, and the wafer optical inspection device includes: an image capturing device, including a photosensitive device, a LED light source and a laser light source, wherein the LED light source generates reflective features at an edge of the batch wafers, the laser light source generates contour features at the edge of the batch wafers, and the photosensitive device captures a wafer image, the reflective features and the contour features to form a side image of the wafer group; and an image recognition device, recognizing a wafer count and wafer positions of the batch wafers through the side image of the wafer group.

Another aspect of the present invention is to provide a wafer optical inspection method, including: installing a wafer optical inspection system in an equipment, wherein the equipment includes at least one process zone for placing a wafer group of batch wafers, and the wafer optical inspection device includes: an image capturing device including a photosensitive device, a LED light source and a laser light source; and an image recognition device; capturing a side image of the wafer group through the image capturing device, wherein the LED light source generates reflective features at an edge of the batch wafers, the laser light source generates contour features at the edge of the batch wafers, and the photosensitive device captures an image of the batch wafers, the reflective features and the contour features to form the side image of the wafer group; and using the image recognition device to identify a batch wafer data of the batch wafers from the side image of the wafer group, wherein the batch wafer data comprises a wafer count and wafer positions of the batch wafers.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are provided to further illustrate the embodiments and are incorporated herein as an integral part of this specification. The drawings illustrate some of the embodiments and, when considered together with the description, help to elucidate their underlying principles. In the drawings.

Figure 1:
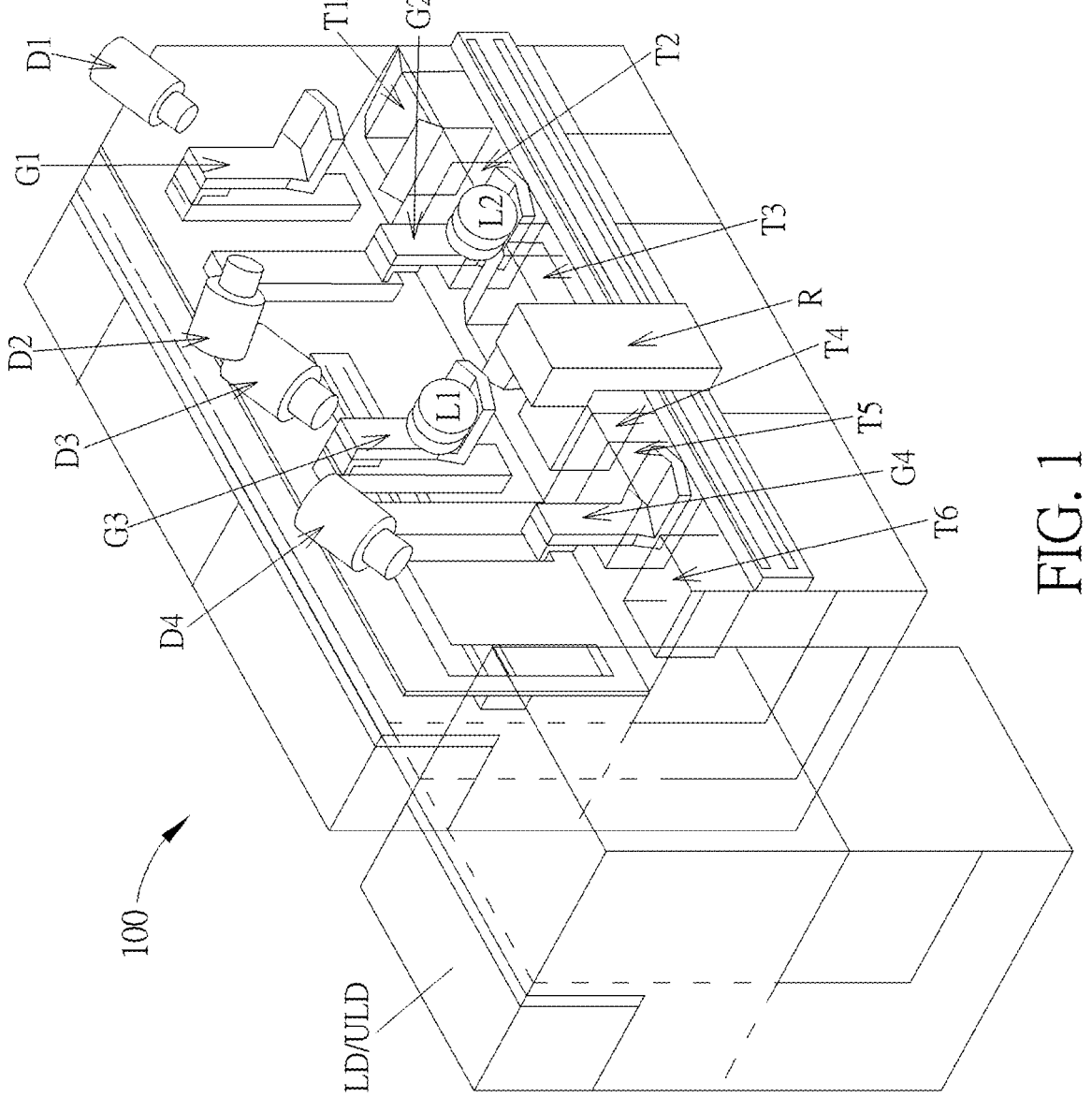
FIG. 1 is an isometric projection of a wet bench equipment equipped with the wafer optical inspection system in accordance with an embodiment of the present invention.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

Reference will now be made in detail to exemplary embodiments of the invention, which are illustrated in the accompanying drawings in order to understand and implement the present disclosure and to realize the technical effect. It can be understood that the following description has been made only by way of example, but not to limit the present disclosure. Various embodiments of the present disclosure and various features in the embodiments that are not conflicted with each other can be combined and rearranged in various ways. Without departing from the spirit and scope of the present disclosure, modifications, equivalents, or improvements to the present disclosure are understandable to those skilled in the art and are intended to be encompassed within the scope of the present disclosure.

It should be readily understood that the meaning of "on," "above," and "over" in the present disclosure should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

In addition, spatially relative terms, such as "beneath," "below," "lower," "above," "upper," and the like, may be used herein for ease of description to describe one element or feature relationship to another element(s) or feature(s) as illustrated in the figures.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. Additionally, the term "based on" may be understood as not necessarily intended to convey an exclusive set of factors, but may allow for the presence of other factors not necessarily expressly described, again depending at least in part on the context.

It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Referring now to FIG. 1, it is an isometric projection of a wet bench equipment equipped with the wafer optical inspection devices of the present invention, as implemented in one embodiment of the invention. This illustration provides a clear understanding of how the wafer optical inspection devices integrate with and function alongside the wet bench equipment. It should be noted that the wafer optical inspection system of the present invention is not limited to wet bench equipment. Rather, the device features and method concepts of the invention can also be seamlessly applied to any other equipment or chamber that requires precise detection of wafer quantity and positioning within a wafer cassette during the process.

As illustrated in FIG. 1, the wet bench equipment 100 of the present invention represents a typical batch-type wafer wet etching equipment commonly used in semiconductor processes. The function of such equipment is to remove the surface layer of semiconductor material through the use of chemical liquids. It supports traditional process steps such as pre-cleaning, etching, post-etching cleaning, and photoresist stripping, all of which are crucial for the manufacture of integrated circuits. In prior art, wafer boxes (such as SMIF or FOUP, not shown) are generally inspected first to determine the number and position of wafers within the cassette, checking for issues like broken wafers, missing wafers, or abnormal positioning. Once verified, the wafer box outside the equipment is loaded into the processing space within the equipment via a loading port LD for subsequent processing. In this embodiment, the wet bench equipment 100 is equipped with six process tanks T1-T6, each filled with chemical liquids used for cleaning or etching. These chemical liquids have varying effects on different materials and processes.

For example, process tank T1 may contain a sulfuric peroxide mixture (SPM), commonly known as Piranha solution, which is used for cleaning organic contaminants such as grease or photoresist residues from the wafer surface. Process tank T2 may hold heated deionized water at temperatures ranging from 60° C. to 80° C. (HQDR, heated quick dump rinse), used to rinse off large oxide particles generated after the SPM process. Process tank T3 may contain an ammonium peroxide mixture (APM, also known as Standard Clean-1, SC-1), used to clean particles remaining on the wafer surface after the previous process. Process tank T5 performs the final RCA wet cleaning step, first using SC-1 and then using SC-2 (e.g., hydrochloric peroxide mixture, HPM) to thoroughly remove metal ions and contaminants from the wafer surface. Finally, the cleaned wafers are placed back into the wafer cassette and unloaded from the equipment via the unloading port ULD.

Continuing with reference to FIG. 1, the transfer and movement of wafers between the loading port LD, unloading port ULD, and the process tanks T1-T6 are managed by wafer handling devices G1-G4 (e.g., wet bench wafer lifters) and robotic arm R positioned within the equipment. Specifically, in this embodiment, wafer handling devices G1-G4 are tasked with transferring wafers into the process tanks T1-T6 for cleaning, and subsequently removing them for transfer to the unloading port ULD via a track for unloading from the equipment. In this embodiment, the transfer of wafers between different wafer handling devices G1-G4 is facilitated by a robotic arm R installed along the side of the equipment. A typical wet bench equipment 100 operates in a batch mode, processing two wafer lots simultaneously, as depicted by the wafer groups (or batch wafers) L1 and L2 in the diagram, with each wafer group L1, L2 containing up to 50 wafers. As previously noted, prior art system only includes inspection devices installed at the loading port LD and unloading port ULD to determine the number and position of wafers on the wafer cassette before and after the overall wet etching process. There is no means to monitor the wafer status during the process inside the process tanks T1-T6. Consequently, if a malfunction occurs in the wafer handling devices G1-G4 or robotic arm R, or if an abnormality arises in the wet etching process leading to improper wafer positioning, it can cause issues such as skipped, sticking, skewing, or even wafer breakage. These problems remain undetected in real-time during the process, resulting in further potential secondary damage when the wafers are transferred later.

To address the aforementioned issues in prior art, and with continued reference to FIG. 1, the embodiment of the present invention integrates a corresponding image capturing device D1-D4 for each wafer handling device G1-G4 within the wet bench equipment 100. These image capturing devices D1-D4 are installed and positioned above the process tanks T1-T6 to capture images of the wafer groups on their respective wafer handling devices G1-G4. Specifically, as shown in FIG. 1, when wafer group L1 completes the cleaning process in process tank T4, it is lifted by the corresponding wafer handling device G3 above the process tank T4, where it is transferred from the wafer handling device G3 to the robotic arm R. This wafer transfer position serves as an inspection zone for the wafer image in the present invention, where the corresponding image capturing device D3, installed above the process tank T3, captures an image of the wafer group L1 on wafer handling device G3. This allows for the confirmation of the mechanical transfer position and enable the detection of the wafer group L1's wafer count and position, further determining whether there are any broken, missing, skewed, skipped, or sticking wafers. If any abnormalities are detected upon comparison with reference data, the system is capable of automatically issuing a command to the equipment to stop the process, thereby preventing further damage during subsequent transfers or processes.

Figure 2:
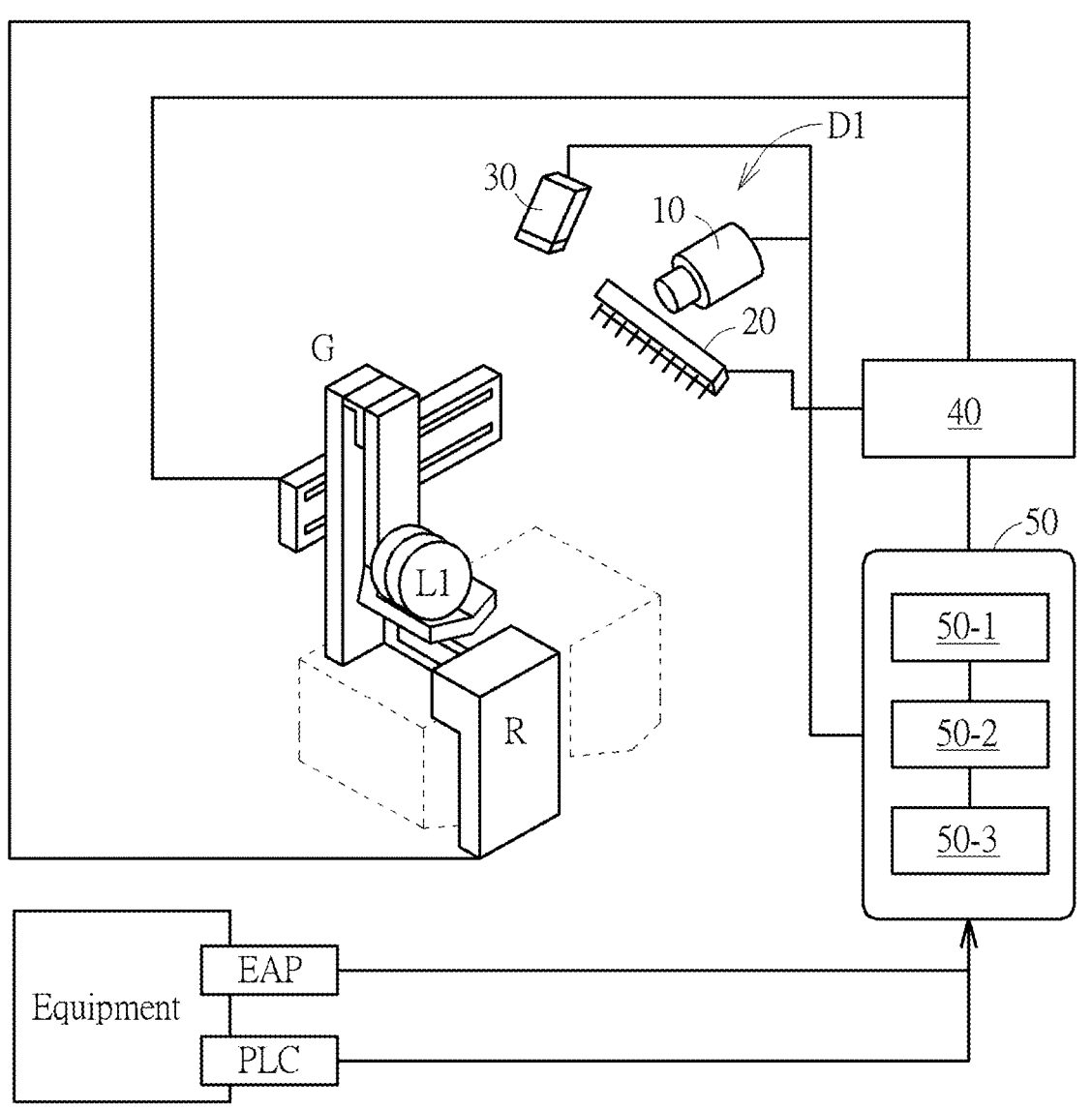
FIG. 2 is a schematic diagram of the architecture of the wafer optical inspection system in accordance with an embodiment of the present invention.

Now, refer to FIG. 2, which presents a schematic diagram of the architecture of the wafer optical inspection system according to an embodiment of the present invention. This diagram helps the reader understand the collaborative relationship between the wafer optical inspection devices, components of the wet bench equipment, and the control system. As shown in FIG. 2, each image capturing device in the present invention (with D1 as an example) consists of a photosensitive device 10, an LED light source 20, and a laser light source 30. The photosensitive device 10 may be a photosensitive charge-coupled Device (CCD) with an integrated lens, designed to capture a 45-degree side image (also referred to as the wafer edge image) of the wafer group L1. The LED light source 20 may be an LED light strip, which generates reflective features on the surface of the wafer's edge, while the laser light source 30 could be either a red or blue laser, creates contour features along the wafer's edge. These reflective and contour features are then utilized by the system to determine the position and count of the wafers. In the embodiment, the image capturing device D1 is connected to a programmable logic controller (PLC) 40 within the wafer optical inspection system. The PLC 40 adjusts the system's operating status based on changes in external conditions, controls mechanical equipment, manages industrial processes, and coordinates the operation of multiple equipment/devices in complex automation systems. For example, in the embodiment, the PLC 40 receives the wafer images, reflective features, and contour features captured by image capturing device D1 and transmits them to a connected image recognition device 50 for further processing. Additionally, the PLC 40 can control the operation of relevant equipment/devices in the process, such as image capturing devices D1, the wafer handling devices G and robotic arm R in the connected wet bench equipment, as shown in the figure.

Referring again to FIG. 2, the image data received by the programmable logic controller module 40 is processed and recognized by the image recognition device 50. In the embodiment, the image recognition device 50 may include a control host 50-1, recognition software algorithm 50-2, and storage device 50-3. The control host 50-1 performs pre-processing on the incoming data, which includes tasks such as image decoding, conversion, and enhancement. For example, depending on specific practical needs, the image may undergo noise reduction, contrast adjustment, edge detection, and other techniques to improve the accuracy of subsequent image recognition. The recognition software algorithm 50-2 analyzes the image content using machine learning techniques, identifying specific targets or patterns, such as the position and quantity of wafers in the wafer group L1 that is being inspected. The storage device 50-3 stores or backs up the received image data, processed image data, identification results, and event logs for future queries and management. Additionally, the image recognition device 50 can also be connected to the enterprise application platform (EAP) and the programmable logic controller module PLC at the equipment end. The equipment-side enterprise application platform EAP integrates data from various systems and devices (such as PLC modules, sensors, mechanical equipment), offering functions such as alarms, fault diagnosis, and production status monitoring, all within a unified data management platform. The PLC module operates at the field level, responsible for controlling equipment and performing real-time operations in the automation process. By working in tandem, the EAP and PLC module enable more efficient process control and management within in the automation system.

Figure 3:
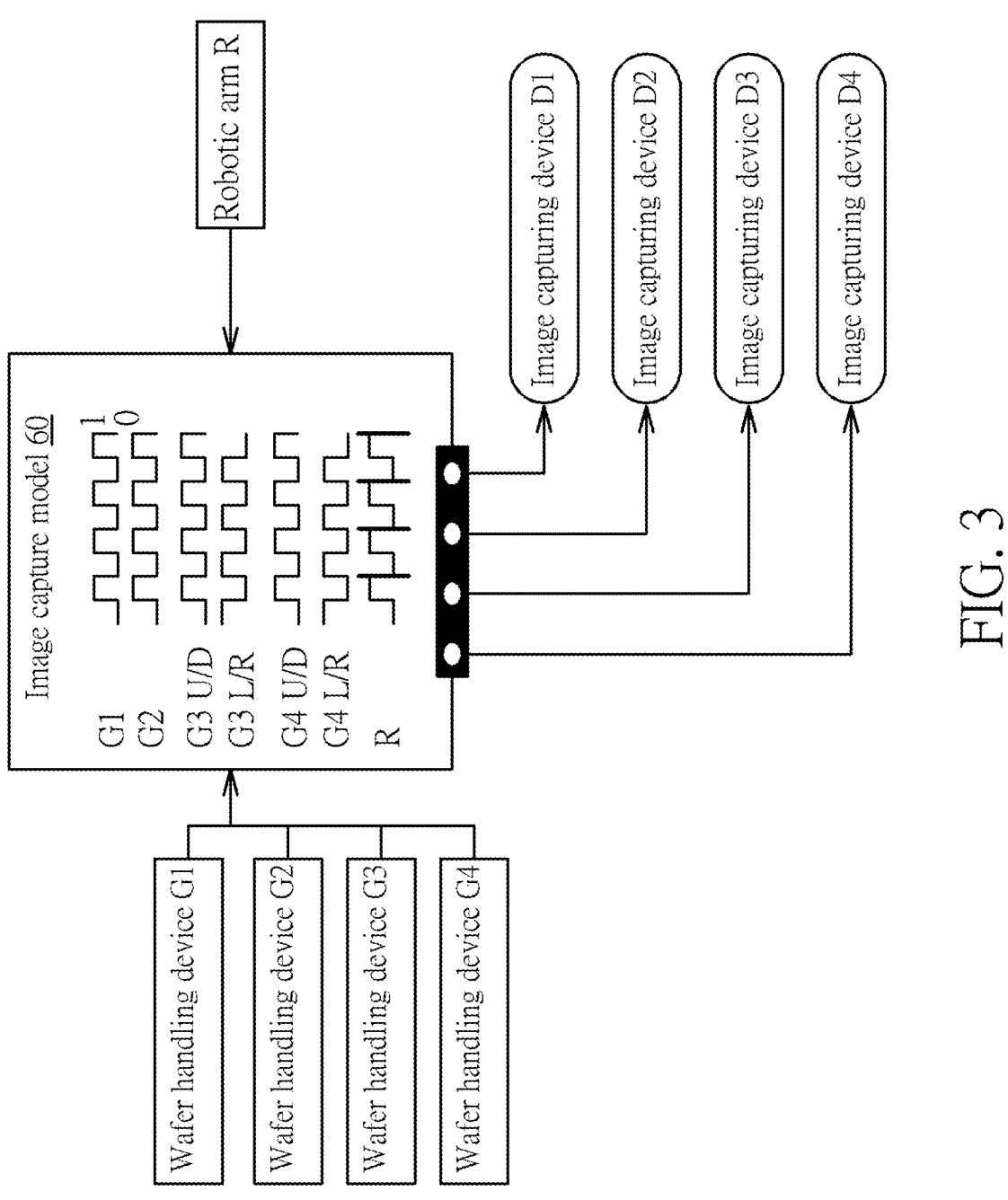
FIG. 3 is a schematic diagram of an image capture model and its associated surrounding devices in accordance with an embodiment of the present invention.

Now, please referring to FIG. 3, it presents a schematic diagram of an image capture model 60 and its associated devices according to an embodiment of the present invention. In this embodiment, the wafer inspection operation is carried out during the mechanical movement process of automated control devices, such as wafer handling devices G1-G4 and robotic arm R. The image capturing devices D1-D4 are placed along the transmission path of the wafer on each wafer handling devices G1-G4, forming the image capture model 60. This model controls the operation of image capturing devices D1-D4. As depicted in FIG. 3, the image capture model 60 may include control signals for the wafer handling devices G1-G4 and the robotic arm R, wherein each control signal consists of two direction phases, represented by "0" and "1". For example, each wafer handling device G1-G4 has its corresponding control signals, wherein the "1" phase indicates the motor moving upward (lifting the wafer), and the "0" phase represents the motor moving downward (lowering the wafer). Additionally, wafer handling devices G3 and G4 both have control signals U/D (Up/Down) and L/R (Left/Right), where the "1" phase of the U/D signal represents the motor moving upward, while the "0" phase represents the motor moving downward. The "1" phase of the L/R control signal represents the motor moving leftward along the track, while the "O" phase represents the motor moving rightward along the track. These control signals are generated by the PLC module 40 to govern the movements of the wafer handling devices G1-G4 and robotic arm R. Moreover, during the mechanical movement process, the PLC module 40 can also direct the image capturing devices D1-D4 to capture images based on the control signals of the wafer handling devices G1-G4 and robotic arm R, thus allowing the real-time monitoring of the wafer condition within the process chamber during the process. For example, in the case of wafer handling device G3 in FIG. 1, when both the U/D and L/R control signals are in the "1" phase and the signal of robotic arm R is configured in the "1" phase at a relative position to the phase of the wafer handling device G3, the wafer group L1 will be positioned directly above process chamber T4 at this moment, and the PLC module 40 can send control commands to the corresponding image capturing device D3 to capture an image, allowing for the analysis of the wafer's position.

Figure 4:
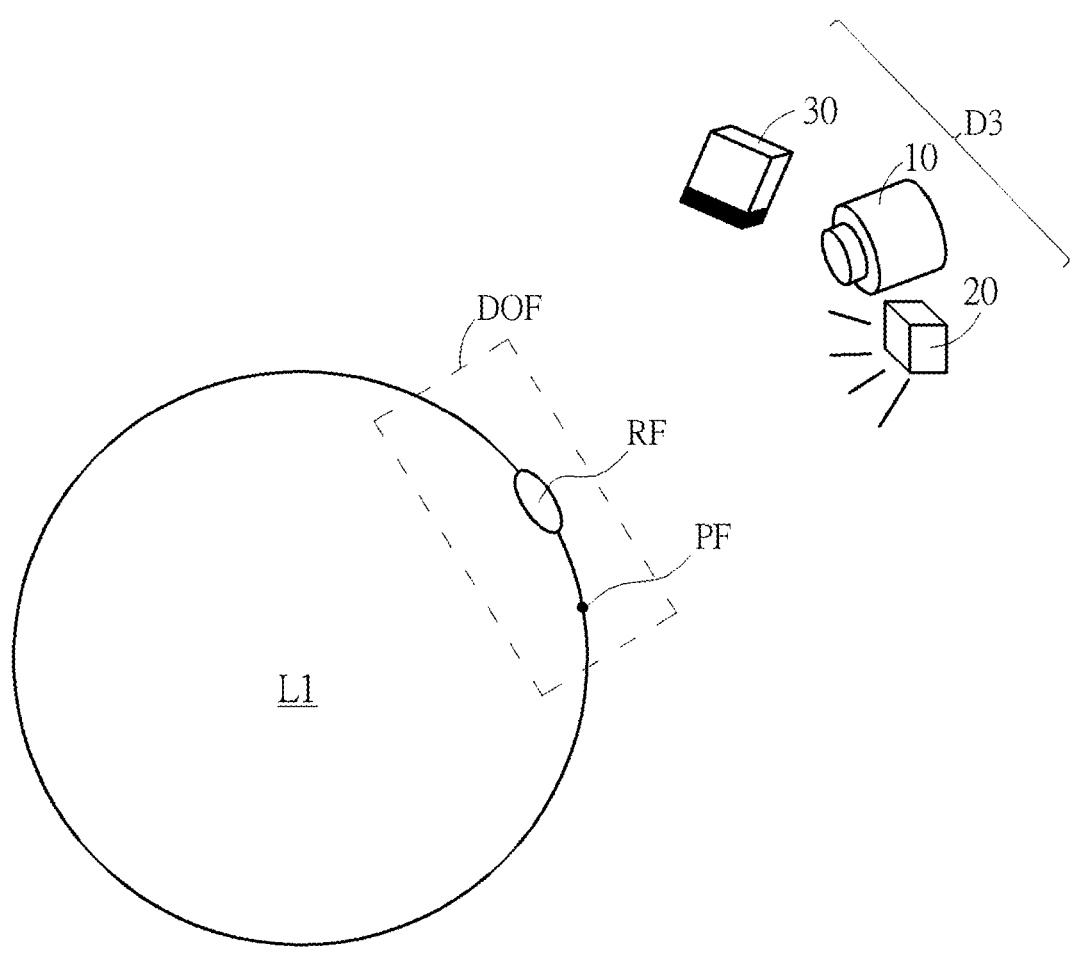
FIG. 4 and FIG. 5 are schematic diagrams illustrating an image capturing device and the wafer group to be measured, viewed from the front and side perspectives in accordance with an embodiment of the present invention.
Figure 5:
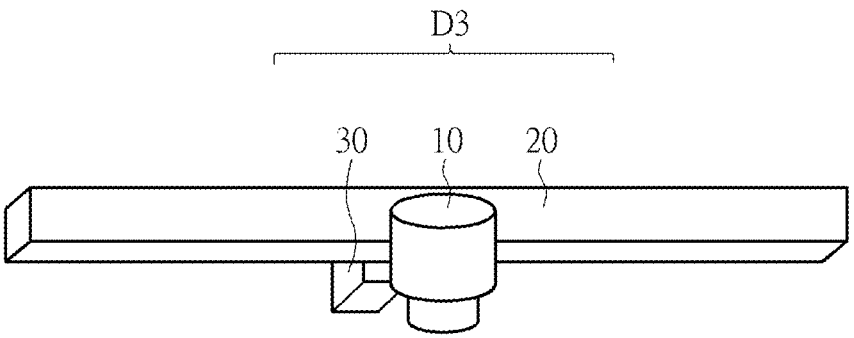
Figure 5:
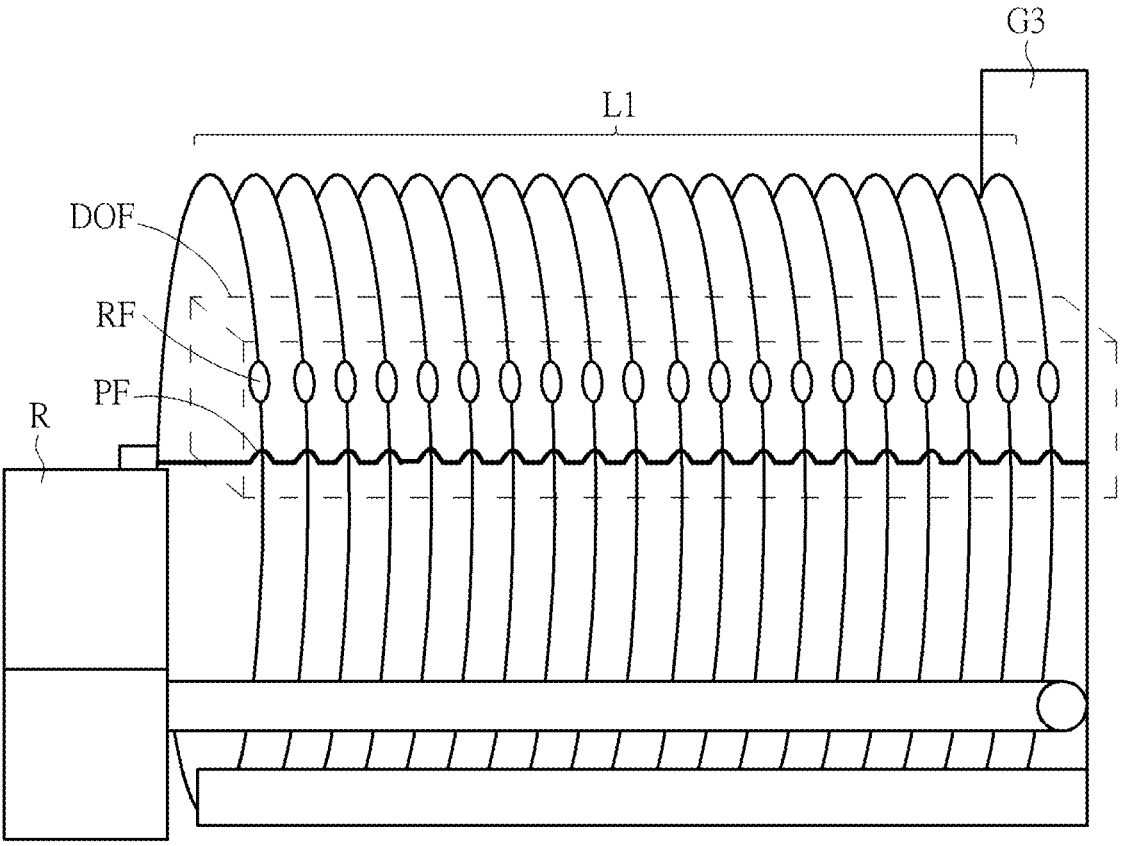

Now, referring collectively to FIG. 4 and FIG. 5, these figures present schematic diagrams of the image capturing device D3 and the wafer group L1 to be inspected, as viewed from the front and side perspectives of the wafer. In this embodiment, the image capturing device D3 of the present invention includes a photosensitive device 10, an LED light source 20, and a laser light source 30. These components are positioned at an oblique angle, preferably 45 degrees, aiming to the side of the wafer group L1 for capture the side image of the wafer group L1, with the wafer's orientation in the side image being ideally vertical. The wafer group L1 under inspection is positioned within the predefined image inspection zone of the present invention, which is situated above the process chamber T4 after the wafer handling device G3 lifts the wafer group L1, as previously shown in FIG. 1. This location also serves as the transfer position where the wafer group L1 is passed to the robotic arm R. The range DOF in the figure represents the depth of field of the photosensitive device 10, within which clear side images of the wafer group can be captured, effectively minimizing background noise. In addition to the side image of the wafer group, the LED light source 20 and laser light source 30 in the image capturing device D3 can generate reflective features RF and contour features PF on the edge of the wafer group L1. These features, together with the side image of the wafer group, collectively form the wafer edge image of the present invention. This combined image can then be used to determine the position and quantity of wafers in the wafer group L1, as well as to identify the position of the transport mechanism (such as the wafer handling devices G1-G4 and the robotic arm R).

Figure 6:
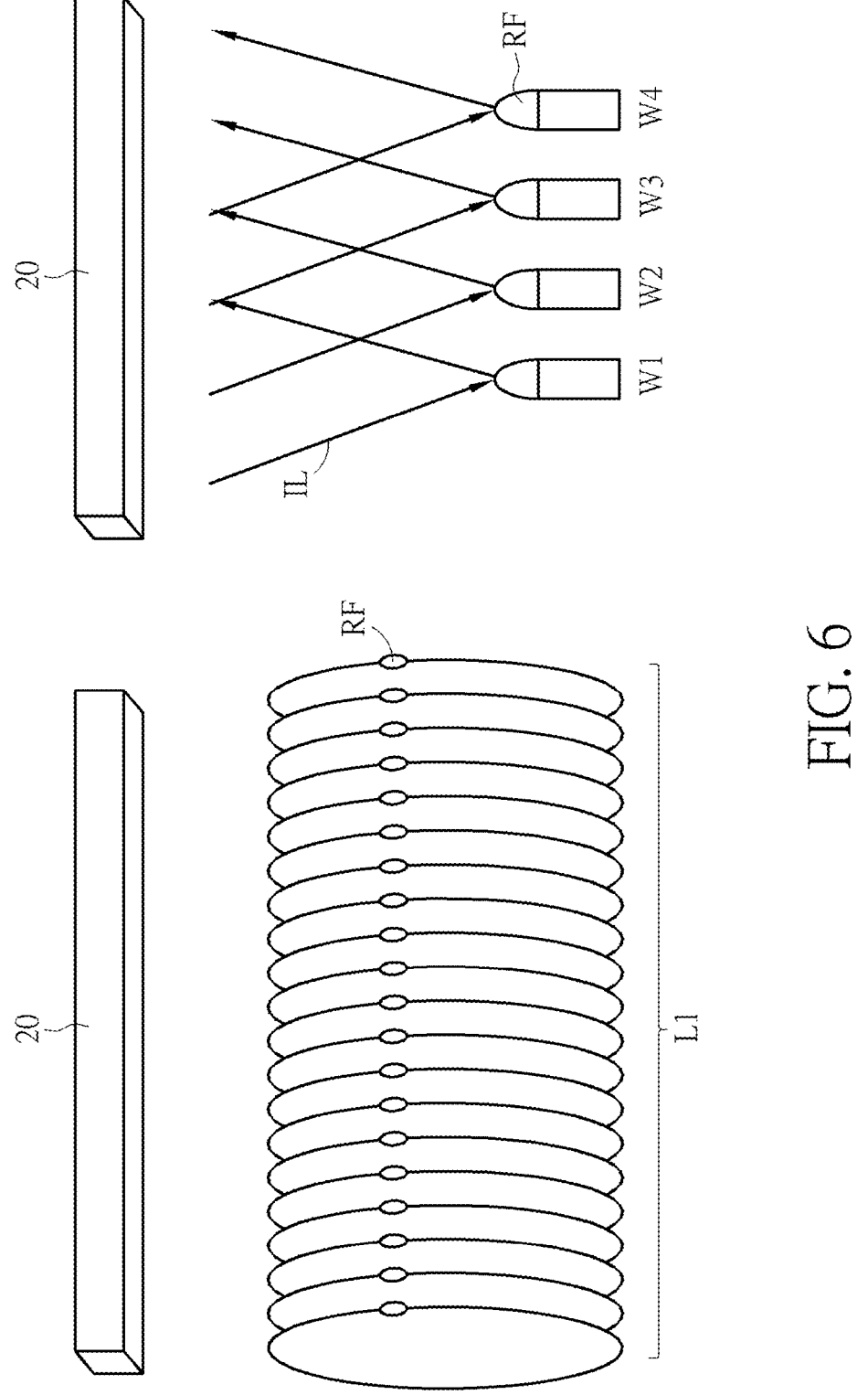
FIG. 6 is a schematic diagram showing the LED light source generating reflective features at the side edge of the wafer group in accordance with an embodiment of the present invention.

Referring now to FIG. 6, it illustrates a schematic diagram of the reflective feature RF generated along the edge of the wafer group L1 using the LED light source 20. In this embodiment, the LED light source 20, such as an LED strip, emits uniformly distributed scattered light, which creates reflective features RF on the edge of the wafer. This phenomenon arises from the wafer's highly reflective material properties. When the LED light source 20 is directed at the side of the wafer group L1 at an oblique angle, the smooth surface of the wafer reflects the incident light IL to the greatest extent, thereby producing regularly spaced reflective features RF within the depth of field. Essentially, each individual wafer in the wafer group L1 (such as W1-W4) generates its own reflective feature RF, which can be used to verify the presence of a wafer in the corresponding wafer slot. It should be noted that during this process, unlike traditional fiber optic sensors that require movement along the side of the wafer group L1, the LED light source 20 is positioned at a fixed location above the process tank. This setup eliminates spatial limitations and requirements, offering a more efficient solution.

Figure 7:
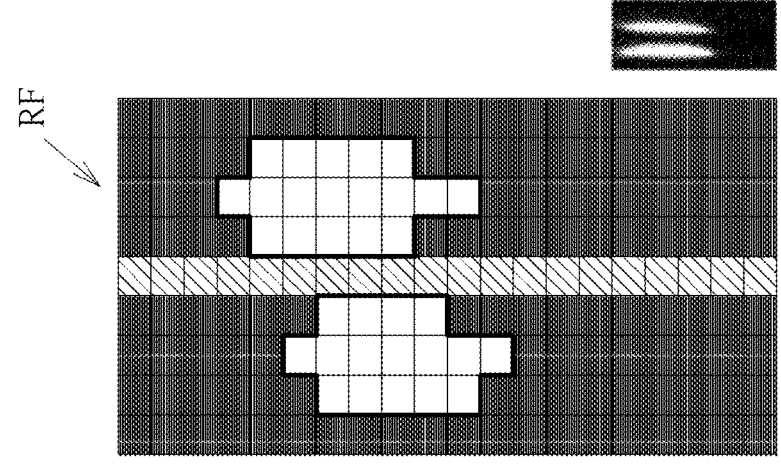
FIG. 7 is an enlarged schematic diagram and real image of various types of the reflective features in accordance with an embodiment of the present invention.
Figure 7:
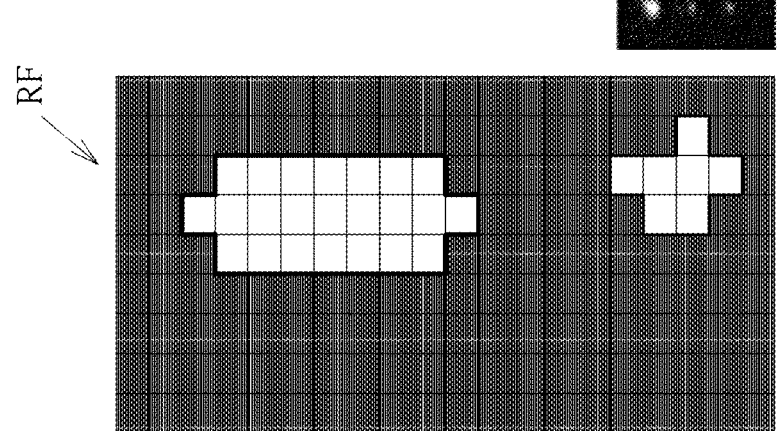
Figure 7:
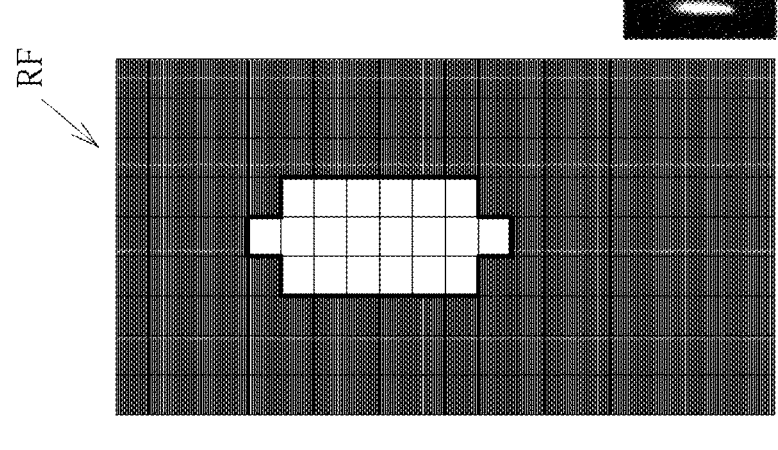
Figure 7:
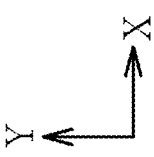

Referring now to FIG. 7, it presents an enlarged schematic diagram illustrating various types of reflective features RF alongside corresponding real images. In practice, the reflective features RF captured by the image capture devices D1-D4 may exhibit different patterns, depending on the wafer's positional status or environmental factors during image capture. The x-axis in the figure represents the arrangement direction of the wafer group, while the y-axis denotes the side (vertical) direction of the wafer. In this embodiment, as shown in the left image, the reflective feature RF appears as a single bright spot, which represents the standard reflection pattern for a properly positioned wafer, indicating that the wafer is in the correct slot without any abnormalities. Here, the "wafer position" refers to the position of the wafer within the corresponding slot of wafer cassette.

The middle image displays multiple non-adjacent bright spots along the y-axis in the reflective feature RF, which can also be determined as the corresponding wafer being correctly positioned with no abnormalities. These multiple bright spots might result from wafer positioning notches or environmental factors during image capture, but they do not suggest any abnormal issue with the wafer itself. On the right, the image shows two non-adjacent bright spots along the x-axis in the reflective feature RF, which could indicate that two wafers are present in the same wafer slot, potentially due to wafer skipping or sticking. Based on these reflective features RF, further detailed determinations can be conducted using additional inspection features and method introduced in subsequent embodiments.

Figure 8:
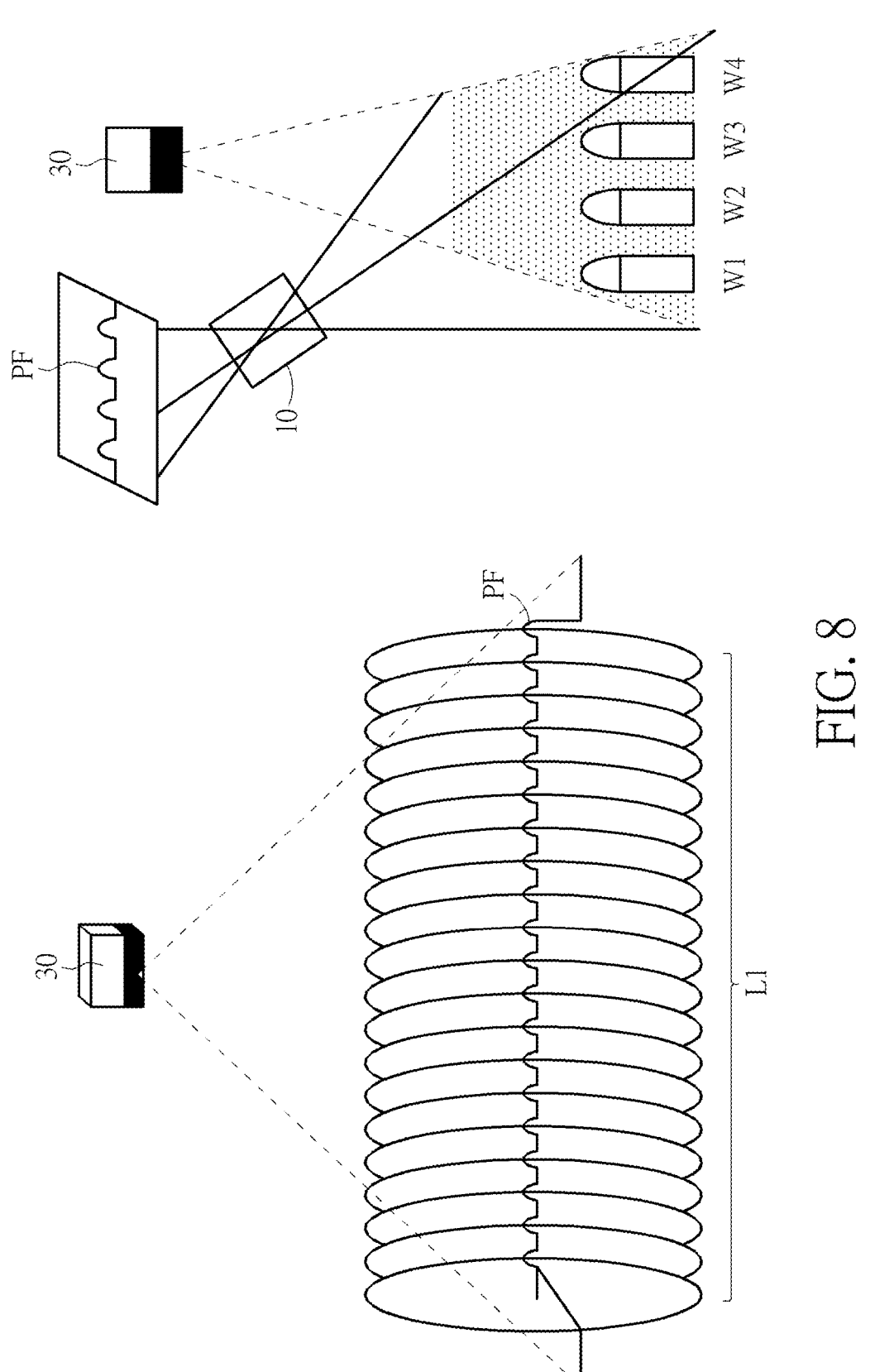
FIG. 8 is a schematic diagram showing the laser light source generating contour features at the edge of the wafer group in accordance with an embodiment of the present invention.

Referring now to FIG. 8, it illustrates a schematic diagram of the contour feature PF generated on the edge of the wafer group L1 using the laser light source 30 according to the present invention. In this embodiment, the laser light source 30, such as a red or blue laser, actively projects a directional beam of light, creating a diffused spot on the target area and thereby forming contour features PF along the wafer's edge. As depicted in the figure, unlike the reflective features RF created by the material properties of the wafer, each wafer edge produces a distinct raised contour under the laser's projection. The photosensitive device 10 then captures and locates this diffused spot, employing the laser triangulation principle to calculate the height and position of the wafer edge, which aids in determining whether a wafer is present in its corresponding wafer slot. Notably, during this process, the laser light source 30 does not need to move along the side of the wafer group L1, as with conventional fiber optic sensors. Instead, it can remain in a fixed position above the process chamber, free from spatial constraints or requirements. In the present invention, the combination of contour features PF and reflective features RF significantly enhances the accuracy of wafer inspection.

Figure 9:
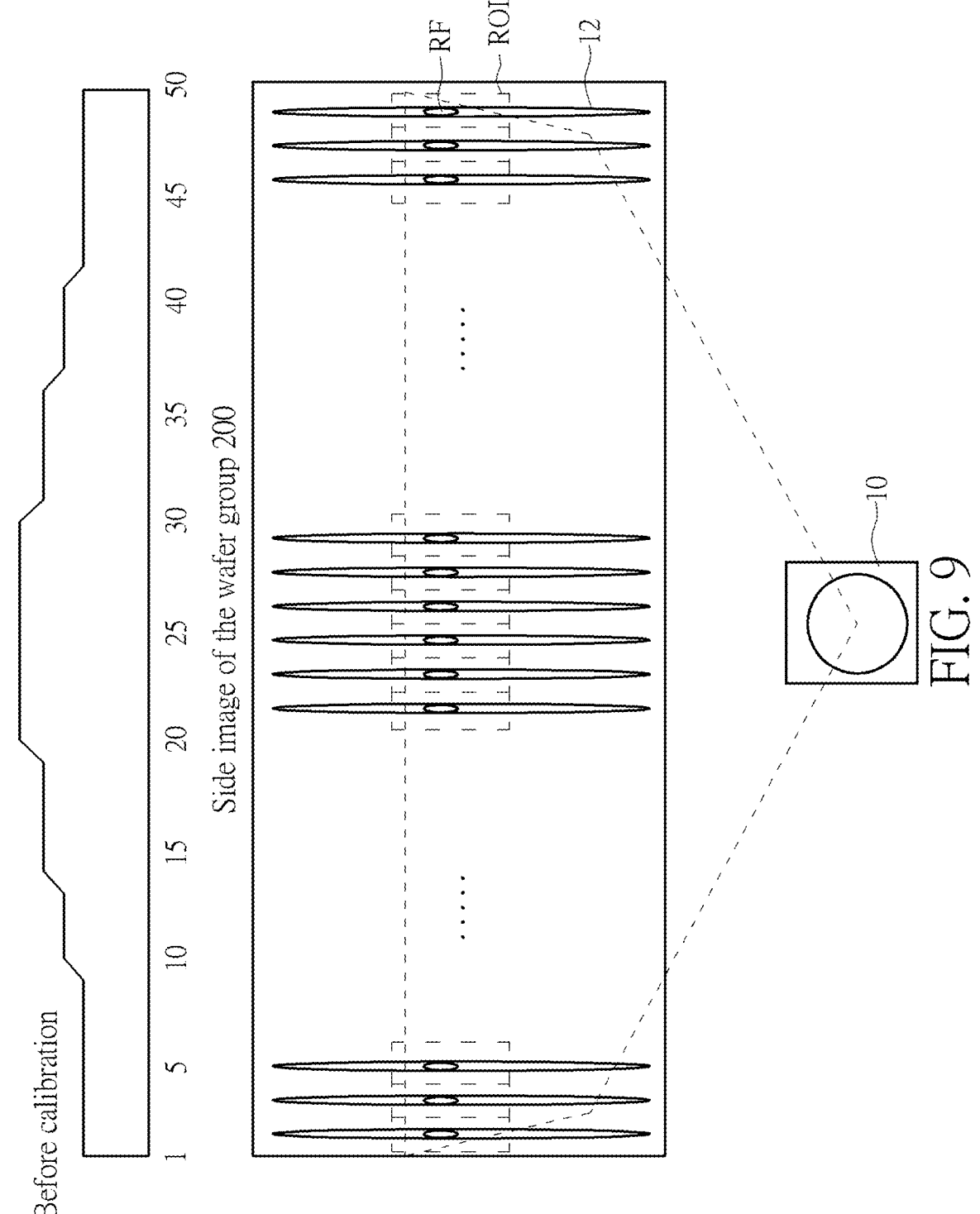
FIG. 9 is a schematic diagram showing the spacing between the wafers before correction and the side image of the wafer group during wafer inspection in accordance with an embodiment of the present invention.

Referring now to FIG. 9, it illustrates a schematic diagram of the spacing between wafers and the side image of the wafer group prior to calibration in wafer inspection according to the present invention. In this embodiment, the photosensitive device 10 can capture the side image 200 of the wafer group within the target area. This side image 200 consists of multiple vertically arranged wafer images 12 and their corresponding reflective features RF and contour features PF. The algorithm defines the region of interest (ROI) for each wafer image 12 based on reflective features RF and contour features PF. Since the photosensitive device 10 is preset to capture the center of the wafer group L1 (for example, capturing the position of the 12th or 13th wafer in a 25-wafer group), there will be slight deviations in the relative position of the outermost wafers and the corresponding region of interest ROI. As shown in the upper part of the figure, the horizontal axis represents the wafer number, while the vertical axis indicates the spacing between wafers. From the figure, it is apparent that the wafers near the center of the wafer group exhibit the largest spacing, with the spacing gradually decreasing as the wafer moves toward the outer side of the group. This phenomenon occurs because the wafers at the periphery are farther from the photosensitive device 10. These differences in wafer spacing can introduce deviations in the resulting 2D image derived from the spacing data. To correct for this, the invention applies vector deviation correction to the measured spacing data, ensuring the acquisition of precise and accurate wafer spacing measurements.

Figure 10:
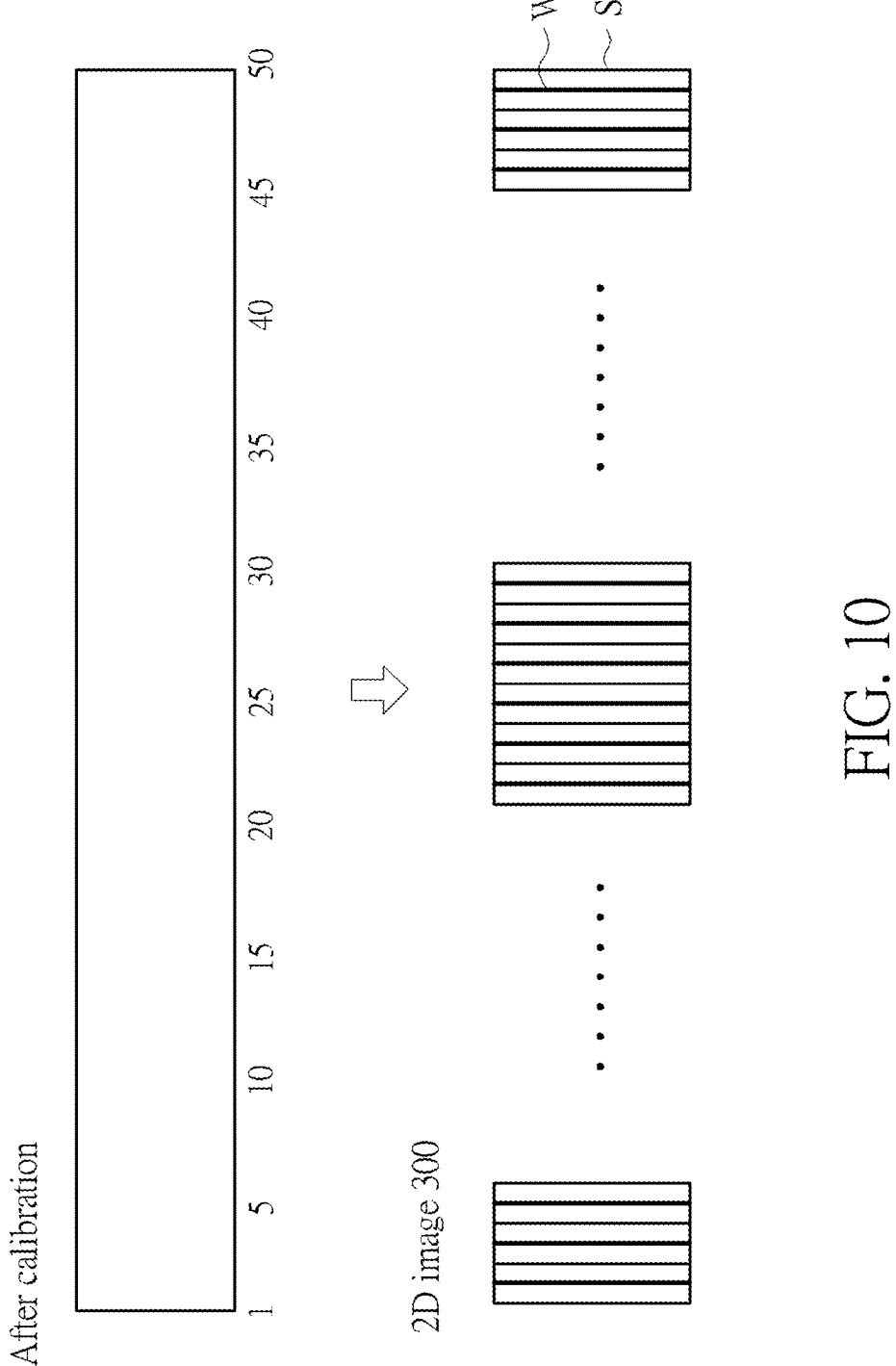
FIG. 10 is a schematic diagram showing the spacing between wafers after correction and the generated 2D image of the wafer group in accordance with an embodiment of the present invention.

Refer now to FIG. 10, which presents a schematic diagram of the spacing between wafers after calibration and the resulting 2D image 300 of the wafer group in the wafer inspection according to an embodiment of the present invention. As seen in the figure, the side image 200 of wafer group, once subjected to vector calibration, results in more consistent and uniform wafer spacing data, eliminating the previous trend of decreasing spacing as the wafers move toward the outer edges. Upon obtaining the calibrated wafer spacing data, a 2D image 300 of wafer group can be generated based on this data, as illustrated in the lower section of the figure. This image includes multiple wafer images W and their corresponding slot grids S, which are subsequently used for template matching and analysis by the system.

Figure 11:
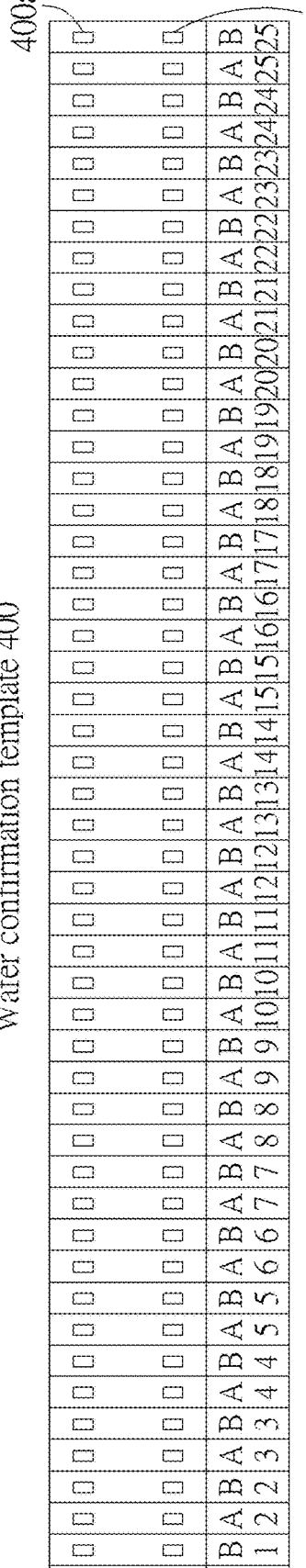
FIG. 11 is an image of a wafer confirmation template and a template matching analysis during wafer inspection in accordance with an embodiment of the present invention.

Please refer now to FIG. 11, which illustrates an image of a wafer confirmation template 400 and template matching analysis 500 in the wafer inspection process according to an embodiment of the present invention. In the inspection of present invention, the system applies a wafer confirmation template 400 to the previously obtained 2D image 300 of the wafer group. The wafer confirmation template 400 may consist of slot numbers such as A1-A25, B1-B25. In the case of a regular configuration of batch process in a wet bench equipment, the "A" and "B" represent two wafer boxes included in the wafer group L1, while 1-25 represents the corresponding slot numbers. As seen in the figure, the wafers in wafer group L1 are alternately arranged in the slots of the batch wafers. Each slot in the wafer confirmation template 400 contain two position confirmation boxes 400a, 400b, located near the bottom and top of each slot, respectively, to verify the correct positioning of the wafers and detect any positional abnormalities. On the other hand, the template matching analysis image 500 below illustrates the overlap between the 2D image 300 of the wafer group and the wafer confirmation template 400. In an ideal case, the slot grids S in the 2D image 300 will perfectly align with the slot grids S in the wafer confirmation template 400. Moreover, the wafer images W in the overlapped 2D image 300 will be positioned in the corresponding slot grids S of the wafer confirmation template 400. Therefore, under normal conditions, the wafer images W will overlap with the two position confirmation boxes 400a and 400b within the corresponding slot grids S in the wafer confirmation template 400. In this embodiment of the present invention, whether or not the wafer image W overlapping with the corresponding position confirmation boxes 400a and 400b will determine whether the wafer is present in the slot grid S and whether its position is abnormal.

Figure 12:
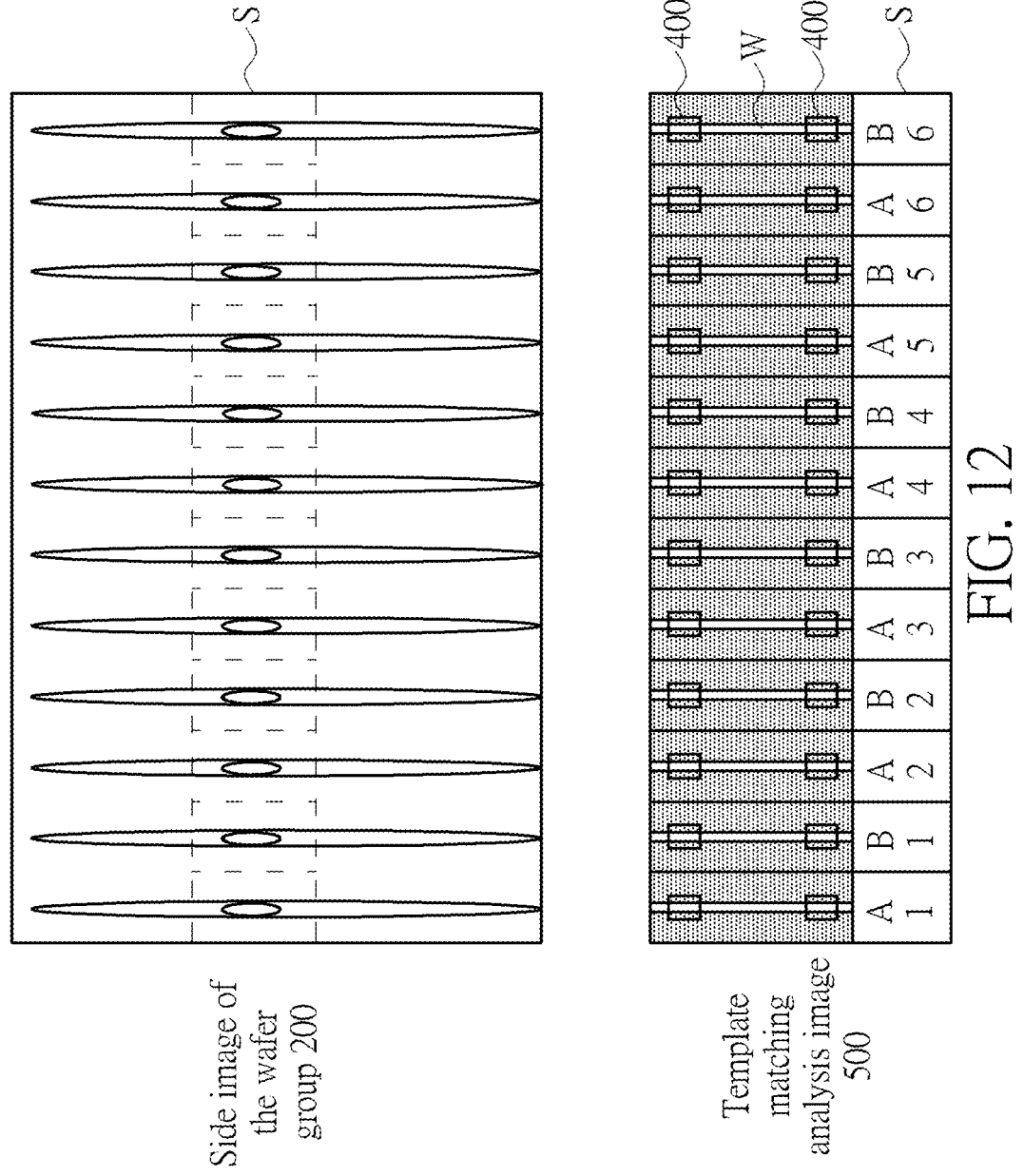
FIG. 12 is an image of the side image of the wafer group and corresponding template matching analysis in accordance with an embodiment of the present invention.

Please refer now to FIG. 12, which presents an image of the side image 200 of the wafer group alongside the corresponding template matching analysis 500 in the wafer inspection process, according to an embodiment of the present invention. This embodiment illustrates a scenario where the wafers are correctly positioned. In this state, each wafer image W in the template matching analysis image 500 will overlap with the position confirmation boxes 400a and 400b within the corresponding slot grid S. When the algorithm verifies that both position confirmation boxes 400a and 400b in the slot grid S overlapping with the wafer image W, the position of the corresponding wafer is confirmed to be correct. However, if either position confirmation box 400a or 400b within the slot grid S fails to overlap with the wafer image W, it indicates an abnormal wafer position.

Figure 13:
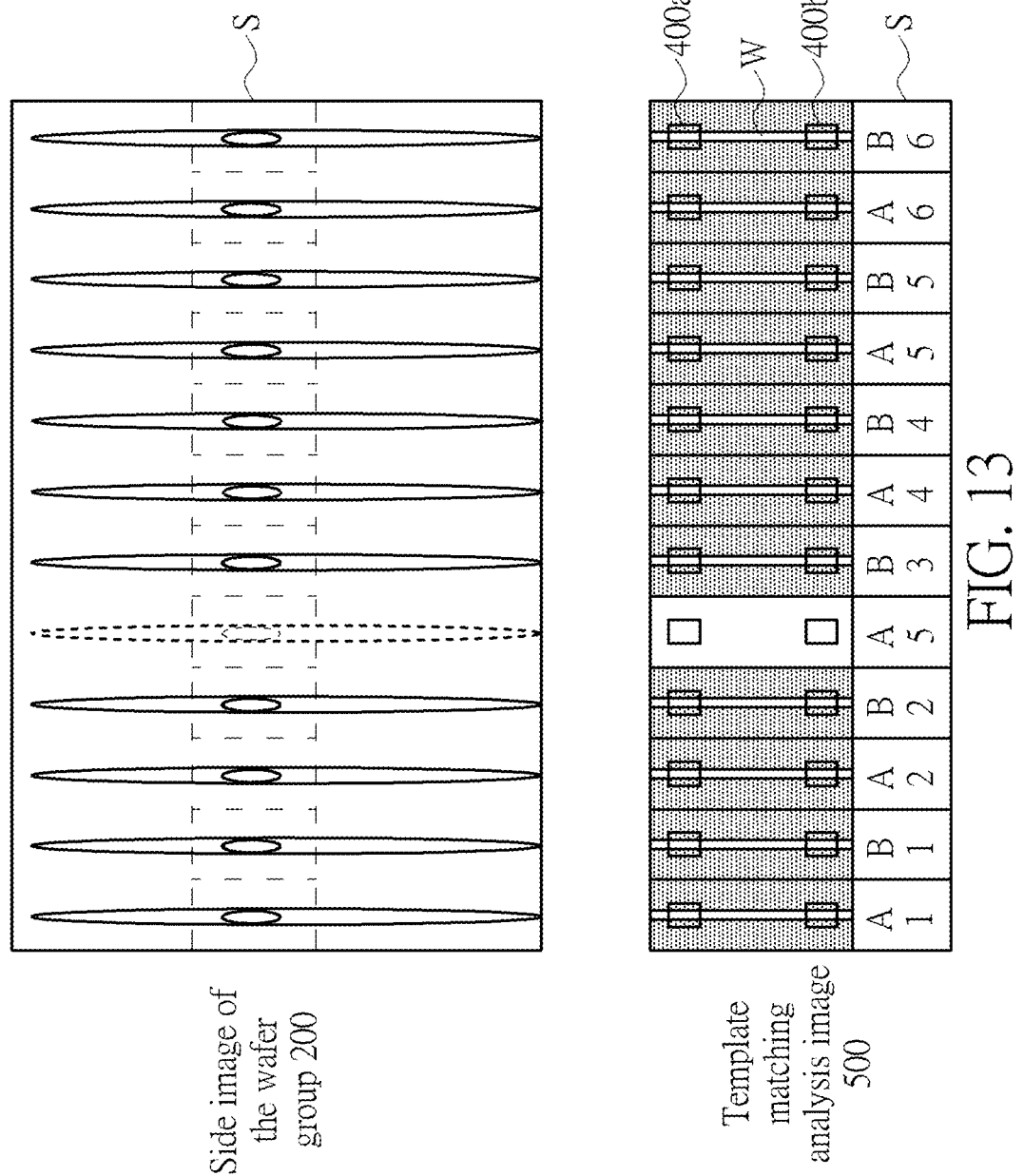
FIG. 13 is an image of the side image of the wafer group and corresponding template matching analysis in accordance with another embodiment of the present invention.

Please refer now to FIG. 13, which presents an image of a side image 200 of the wafer group alongside with the corresponding template matching analysis 500 in the wafer inspection process, according to an embodiment of the present invention. This embodiment illustrates one of the abnormal patterns in wafer positioning. As shown in the figure, a specific slot grid S in the side image 200 is empty, which could indicate a wafer breakage or a missing wafer during the process. In this case, the corresponding slot grid S in the template matching analysis image 500 also lacks a wafer image W, and neither of the position confirmation boxes 400a and 400b will overlap with the wafer image W. The algorithm, therefore, can detect this discrepancy and conclude that the wafer in that specific slot has an abnormal condition, such as wafer breakage or being missing.

Figure 14:
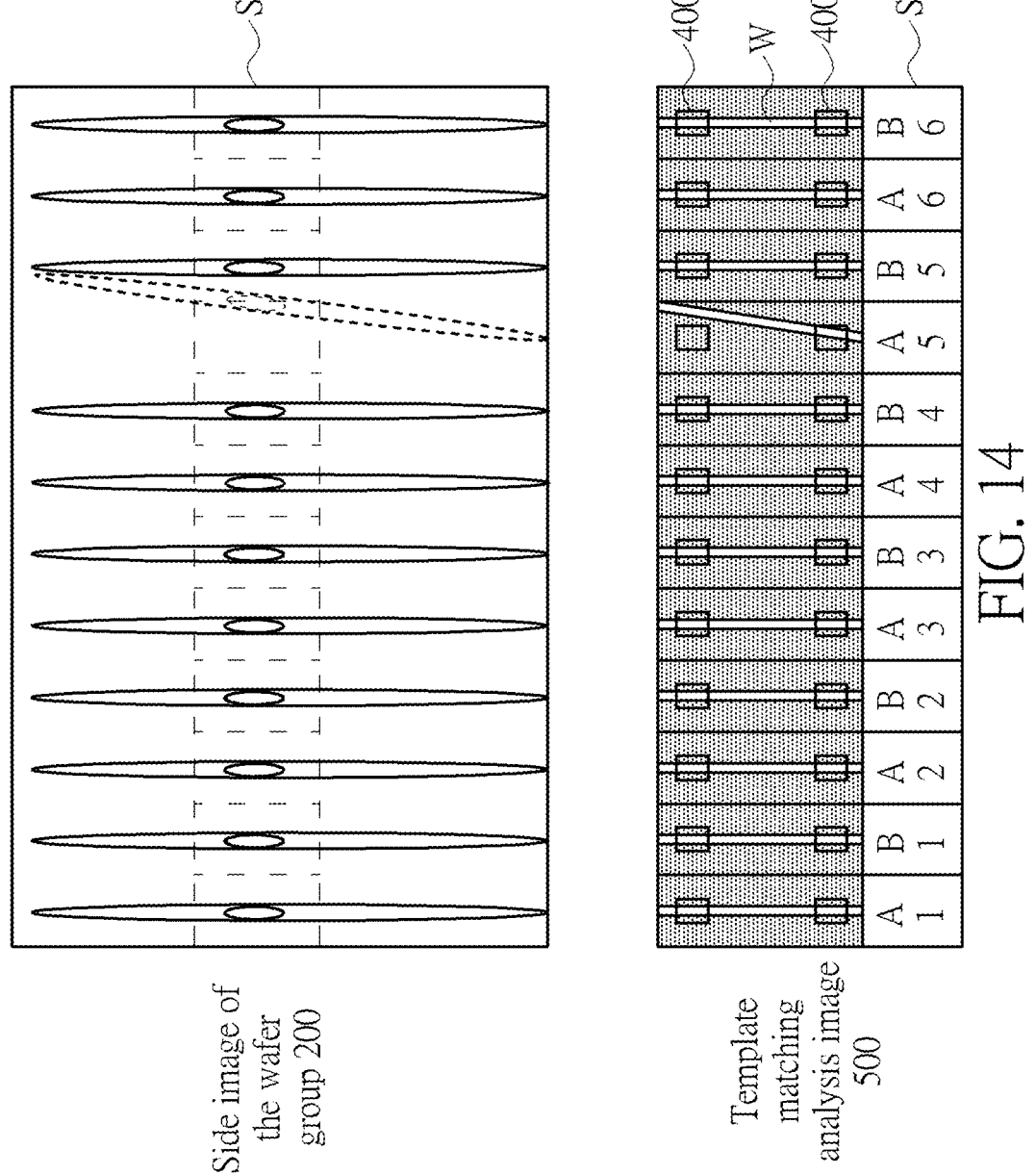
FIG. 14 is an image of the side image of the wafer group and corresponding template matching analysis in accordance with yet another embodiment of the present invention.

Please refer now to FIG. 14, which presents an image of a side image 200 of the wafer group alongside with the corresponding template matching analysis 500 in the wafer inspection process, according to an embodiment of the present invention. This embodiment illustrates another abnormal pattern of wafer positioning. As shown in the figure, a wafer in a specific slot grid S in the side image 200 is skewed. Due to the wafer image W being tilted on one side, the upper position confirmation box 400a in the corresponding slot grid S of the template matching analysis image 500 does not overlap with the wafer image W, while the lower position confirmation box 400b does overlap with the wafer image W. Based on this discrepancy, the algorithm can determine that the wafer in that slot exhibits an abnormal condition, such as skewed wafer.

Figure 15:
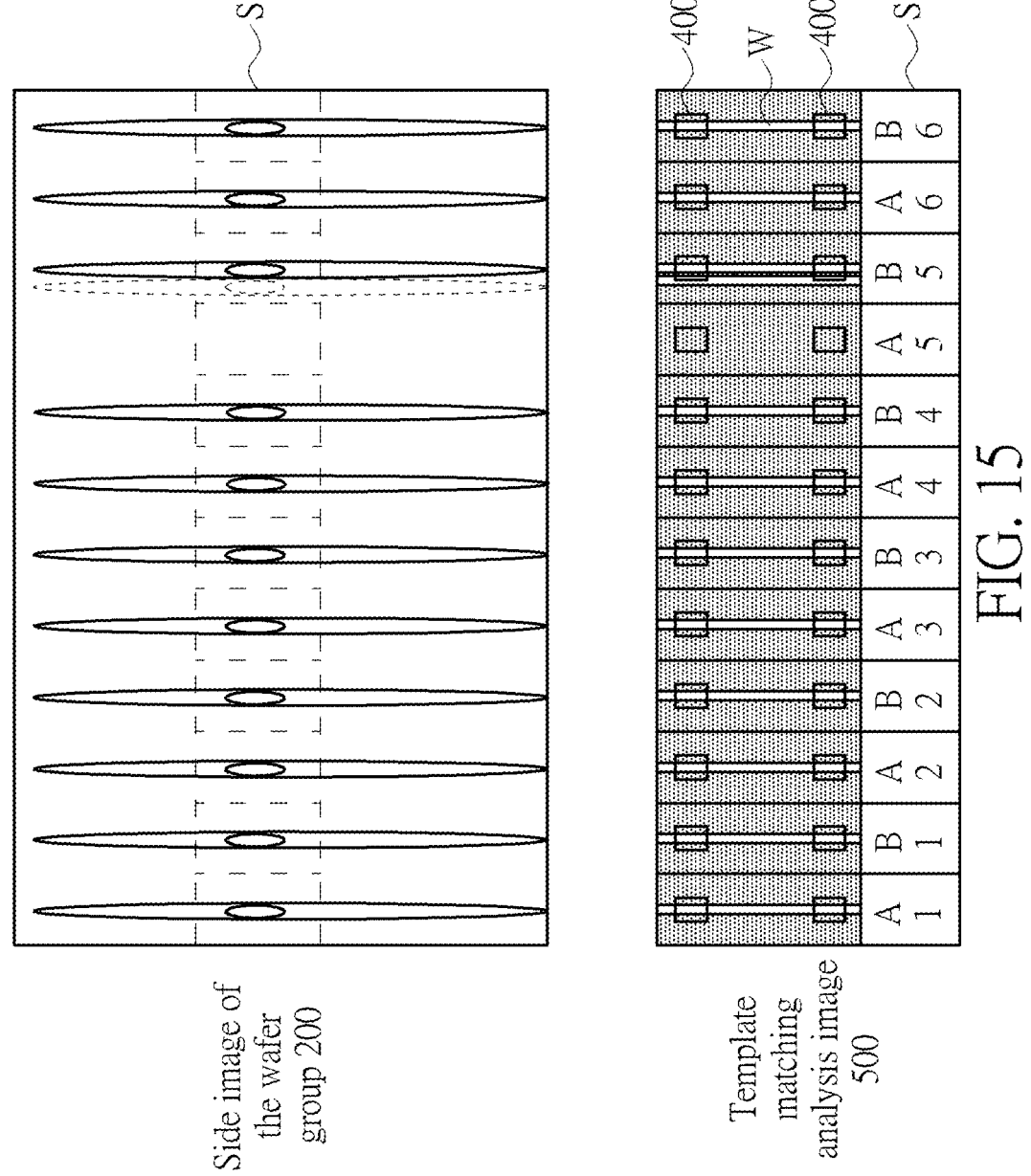
FIG. 15 is an image of the side image of the wafer group and corresponding template matching analysis in accordance with yet another embodiment of the present invention.

Please refer now to FIG. 15, which presents an image of a side image 200 of the wafer group alongside with the corresponding template matching analysis 500 in the wafer inspection process, according to an embodiment of the present invention. This embodiment illustrates another abnormal pattern of wafer positioning. As shown in the figure, a wafer in a specific slot grid S in the side image 200 has been misplaced into an adjacent slot grid. As a result, no wafer image W appears in the corresponding slot grid S, and neither of the position confirmation boxes 400a and 400b in the template matching analysis image 500 overlap with the wafer image W. Furthermore, because there are two wafer images W appearing in the adjacent slot grid S, causing both of the position confirmation boxes 400a and 400b to be flagged as abnormal by the algorithm. The system can, therefore, identify that the wafer in that slot is in an abnormal condition, such as wafer skipping or sticking.

Figure 16:
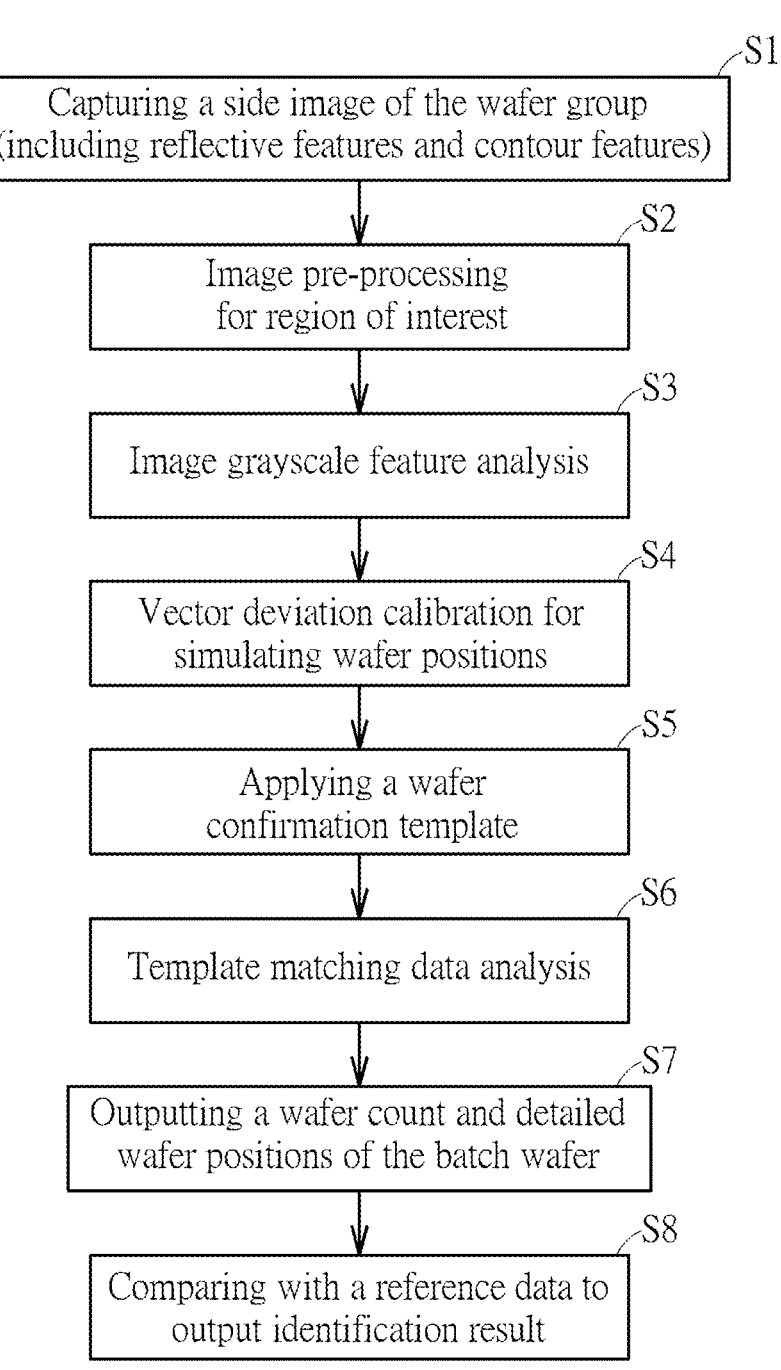
FIG. 16 is a flowchart of the wafer optical inspection method in accordance with an embodiment of the present invention.

Please refer now to FIG. 16, which illustrates a flowchart of the wafer optical inspection method, according to an embodiment of the present invention. It should be noted that in the present invention, the wafer optical inspection method can be performed each time a batch of wafers enters the process tank or batch operation space/zone of the equipment, such as the loading/unloading port or the wafer transfer/cleaning position above the process tank.

Initially, in step S1, a side image of the wafer group is captured (as shown in FIG. 9, image 200). The side image is obtained at a fixed point for a batch wafers (e.g., wafer group L1 in FIG. 5) using the image capturing device of the present invention (e.g., D3 in FIG. 5). In this embodiment, the side image consists of reflective features RF and contour features PF (as shown in FIG. 5). Specifically, the reflective features RF and contour features PF in the present invention can be generated respectively through the LED light source (e.g., 20 in FIG. 5) and the laser light source (e.g., 30 in FIG. 5) in the image capturing device, and are simultaneously captured by the photosensitive device (e.g., 10 in FIG. 5).

After capturing the side image of the wafer group, step S2 involves performing image pre-processing on the region of interest (ROI) within the side image. The region of interest can be pre-defined by the system or algorithm (e.g., as shown as ROI in FIG. 9), which refers to the specific portion of the captured side image that will undergo analysis and processing by the system. The image pre-processing is carried out by the control host in the image recognition device (e.g., 50-1 in FIG. 2), and includes steps such as decoding, transforming, and enhancing the side image of the wafer group within the designated region of interest. For instance, depending on the practical needs, techniques like noise reduction, contrast adjustment, edge detection, and more can be applied to optimize the quality of the image, thereby improving the accuracy of the subsequent recognition process.

Following the pre-processing, step S3 involves conducting grayscale feature analysis on the processed side image of the wafer group. Grayscale feature analysis primarily involves characterizing and identifying the image content by evaluating various statistical and geometric features of the grayscale image. In the embodiment, this task is performed by the recognition software algorithm in the image recognition device (e.g., 50-2 in FIG. 2). Grayscale feature analysis may encompass techniques such as histogram analysis, texture feature analysis, edge feature analysis, shape feature analysis, etc. Through grayscale feature analysis, the system is able to extract the side contour information of each wafer in the side image of the wafer group, which is essential for the subsequent calibration and determination processes.

Once grayscale feature analysis is completed, step S4 proceeds with vector deviation calibration to simulate the wafer positions. As outlined in the embodiment of FIG. 9, since the image capturing device capture the image in alignment with the center point of the wafer group, slight positional deviations may occur, especially at the outer edges of the wafer group. These deviations can lead to inconsistencies in the region of interest. To address this, vector deviation calibration is employed to generate more uniform and consistent wafer spacing data. This corrected data is then used to construct an accurate 2D image of the wafer group (e.g., 300 in FIG. 10). The vector deviation calibration can also be performed by the recognition software algorithm in the image recognition device (e.g., 50-2 in FIG. 2).

After completing vector deviation calibration and generating 2D image, step S5 applies a wafer confirmation template to the 2D image. As shown in 400 in FIG. 11, the wafer confirmation template contains the information like predefined slot numbers of the batch wafers (e.g., A1-A25, B1-B25) and two position confirmation boxes 400a, 400b necessary for analysis and application. The wafer confirmation template can be provided by the enterprise application platform (EAP) at the equipment end and is transmitted to the image recognition device for subsequent matching processing.

After applying the wafer confirmation template in step S5, step S6 involves performing a template matching data analysis. This template matching data analysis is executed using the recognition software algorithm in the image recognition device (e.g., 50-2 in FIG. 2), as illustrated in the template matching analysis image 500 from FIG. 11 to FIG. 15. The wafer confirmation template provided in step S5 is applied to the 2D image 300 of the wafer group obtained in step S4, so that the wafer images W in the 2D image 300 are positioned within the corresponding slot grid S of the wafer confirmation template 400, allowing the algorithm to determine whether any wafer image W overlaps with the two position confirmation boxes 400a, 400b, which helps assess whether a wafer present in the slot and whether its position is abnormal. Detailed descriptions of various wafer states can be found in FIGS. 12 to 15, so further elaboration is not necessary here. Once the template matching data analysis is complete, the batch wafer data-encompassing the number of wafers and their specific positions, can be obtained and temporarily stored in the storage device of the image recognition device (e.g., 50-3 in FIG. 2).

Following the template matching data analysis in step S6, step S7 involves outputting the batch wafer data, which includes the wafer count and specific positions obtained earlier. This data is then transmitted from the image recognition device (e.g., 50 in FIG. 2) to the enterprise application platform (EAP) at the equipment end, where it is compared with reference data for further analysis.

After the batch wafer data is output, step S8 involves comparing this output batch wafer data with reference data to generate the final identification result. In the embodiment, the reference data may consist of the batch wafer data from a previous batch treatment/process, which includes the number of wafers and their specific positions following the previous batch process. This data may be provided by the enterprise application platform (e.g., EAP in FIG. 2) at the equipment end for comparison. If discrepancies are found in the comparison, such as mismatched wafers in certain slot grids, the system will automatically issue a command to stop the process. For example, when the enterprise application platform (e.g., EAP in FIG. 2) identifies a mismatch, it will issue a real-time instruction to the programmable logic controller in the equipment (e.g., PLC in FIG. 2), prompting the equipment to trigger an alarm and interrupt the process, while also diagnosing the fault based on the received data.

Figure 17:
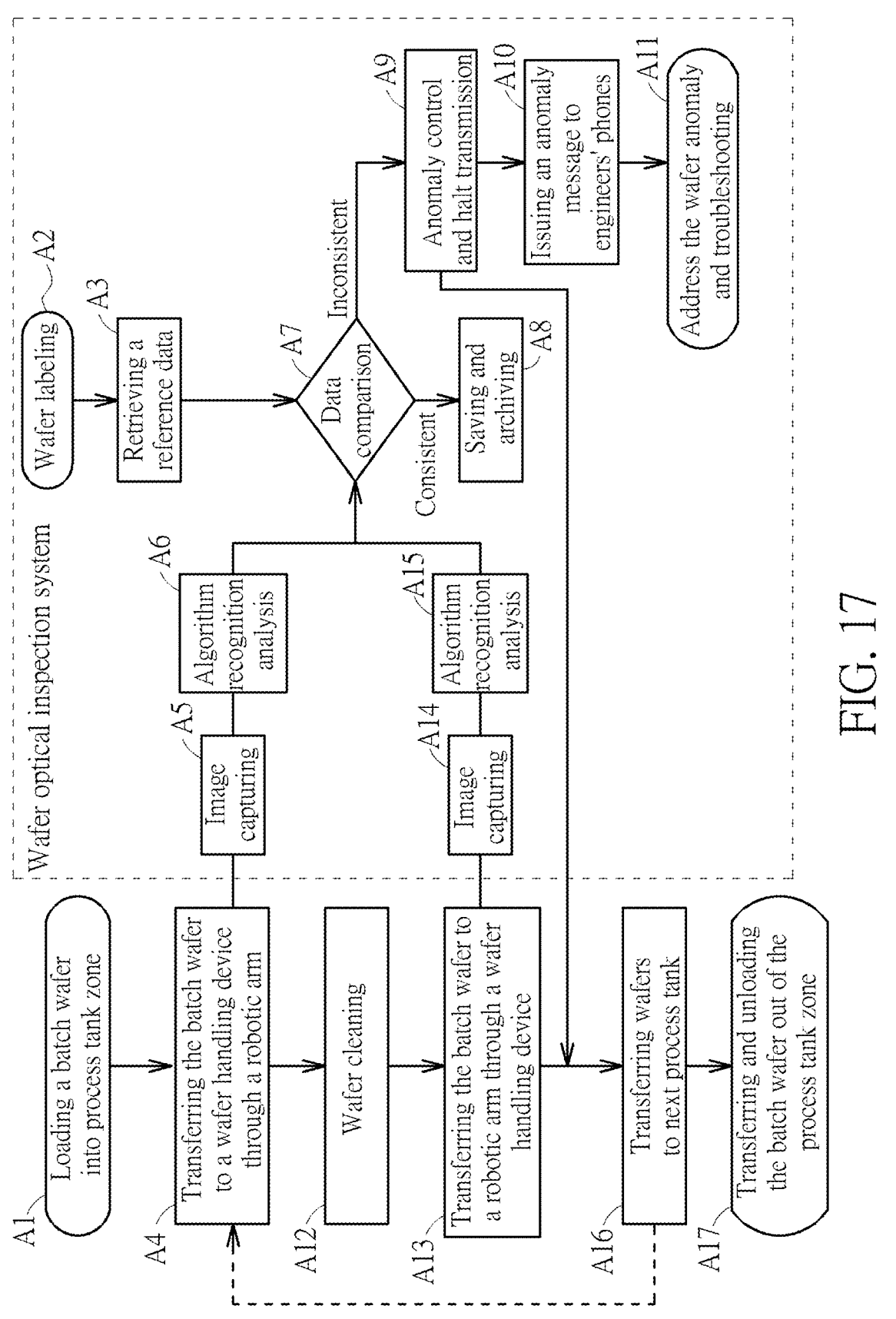
FIG. 17 is a block diagram of the wafer optical inspection system and equipment in accordance with an embodiment of the present invention.

Refer now to FIG. 17, which is a functional block diagram of the wafer optical inspection system and the equipment. From this diagram, the reader can gain an understanding of how the wafer optical inspection system interacts with the equipment actions.

As shown in FIG. 17, at the process equipment end, the batch wafer in process is initially transferred into the process tank (Action A1). For instance, as depicted in FIG. 1, the wafer group L1 is loaded from the loading port LD into the internal process space of the equipment. Regarding the wafer optical inspection system, the system begins by labeling the batch wafer (Action A2). In this case, the wafer group L1 is assigned virtual labels L101-L150 for tracking in the process tank. Following the labeling of the wafers, the corresponding reference data (such as the reference data in step 8 of FIG. 16) for the batch wafer is recorded in the system end. This data is retrieved from the EAP system after the completion of the previous process, including wafer count and position information, which will later be used for comparison (Action A3). With respect to the process equipment end, the loaded batch wafers are transferred by a robotic arm to the wafer handling device within the process tank for the next batch process (Action A4). For example, as shown in FIG. 1, the robotic arm R moves the wafer group L1 from process tank T2 to the wafer handling device G3 above process tank T3. At this point, the wafer optical inspection system captures an image of the batch wafers (Action A5), as illustrated in the embodiment of image capturing in FIG. 5, and then conducts algorithm recognition analysis (Action A6), as detailed in steps S5-S7 of FIG. 16. This process involves applying the wafer confirmation template and performing template matching data analysis to determine the current wafer count and detailed positions of the batch wafers. Subsequently, the batch wafer data obtained is compared with the reference data (Action A7). If the data matches, it indicates that the batch wafer state is normal, and the process can proceed to archiving and continuation (Action A8). However, if a data mismatch is detected, suggesting an abnormal batch wafer state, the system will initiate process/equipment anomaly control and send a command to the equipment to stop the transfer and halt subsequent processing (Action A9). The system can also automatically issue an anomaly message or alert to the relevant engineers' phones (Action A10), notifying them to address the wafer anomaly and initiate troubleshooting (Action A11).

Continuing with referring to FIG. 17, if the data comparison in Action A8 confirms accuracy, the batch wafers can be loaded into the process tank for cleaning (Action A12). For example, as shown in FIG. 1, the wafer handling device G3 places the wafer group L1 down into process tank T3 for cleaning. Once the cleaning process is completed, the batch wafer are transferred by the wafer handling device to a robotic arm (Action A13). For instance, as depicted in FIG. 1, the wafer handling device G3 moves the wafer group L1 upward from process tank T3 and hands it over to the robotic arm R. At this stage, the wafer optical inspection system captures another image of the wafers (Action A14) and performs algorithm recognition analysis (Action A15) again. The batch wafer data is once again compared with the reference data (Action A7). From this process flow, it is evident that in the embodiment of the present invention, the batch wafers undergo inspection both before and after each tank process to ensure no anomalies arise during the process and/or mechanical transfer stages. Once the batch wafers complete the current process, they are ready to be transferred to the next process tank (Action A16). For example, as shown in FIG. 1, the robotic arm R moves the wafer group L1 from the completed process tank T3 to process tank T4. Subsequent actions will follow as described in Action A4, Action A12, and Action A13, and will not be herein elaborated. Finally, once all tank processes are completed, the batch wafers are transferred out of the tank zone (Action A17). For instance, as shown in FIG. 1, wafer groups L1 and L2 are transferred from the unloading port ULD out of the equipment, thereby completing the batch process for that equipment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wafer optical inspection system, installed in an equipment, wherein the equipment comprises at least one process zone for placing a wafer group of batch wafers, and the wafer optical inspection device comprises:
   an image capturing device, comprising a photosensitive device, a LED light source and a laser light source, wherein the LED light source generates reflective features at an edge of the batch wafers, the laser light source generates contour features at the edge of the batch wafers, and the photosensitive device captures a wafer image, the reflective features and the contour features to form a side image of the wafer group; and
   an image recognition device, recognizing a wafer count and wafer positions of the batch wafers through the side image of the wafer group.

2. The wafer optical inspection system of claim 1, wherein the equipment is a wet bench equipment, the process zone is a process tank, and the wet bench equipment comprises at least one wafer handling device to transfer the batch wafers to the process tank, and each of the wafer handling devices is equipped with the corresponding image capturing device.

3. The wafer optical inspection system of claim 1, wherein the image capturing device captures the side image of the batch wafers at an oblique angle.

4. The wafer optical inspection system of claim 1, wherein the image recognition device comprises a recognition software algorithm that identifies the wafer count and the wafer positions of the batch wafers through the recognition software algorithm.

5. The wafer optical inspection system of claim 2, wherein the wet bench equipment comprises a robotic arm to transfer the batch wafers between the different process tanks, and the robotic arm and the wafer handling device transfer the batch wafers at a wafer transfer position above the process tank, and the image capturing device captures the wafer image of the batch wafers when the wafer handling device is positioned at the wafer transfer position.

6. The wafer optical inspection system of claim 5, wherein the wafer positions recognized by the image recognition device are slot grids of the wafer handling device where the batch wafers are positioned.

7. The wafer optical inspection system of claim 1, further comprising a programmable logic control module to control coordination and data transmission between the image capturing device and the image recognition device.

8. A wafer optical inspection method, comprising:

installing a wafer optical inspection system in an equipment, wherein the equipment comprises at least one process zone for placing a wafer group of batch wafers, and the wafer optical inspection device comprises:

an image capturing device comprising a photosensitive device, a LED light source and a laser light source; and an image recognition device;

capturing a side image of the wafer group through the image capturing device, wherein the LED light source generates reflective features at an edge of the batch wafers, the laser light source generates contour features at the edge of the batch wafers, and the photosensitive device captures an image of the batch wafers, the reflective features and the contour features to form the side image of the wafer group; and using the image recognition device to identify a batch wafer data of the batch wafers from the side image of the wafer group, wherein the batch wafer data comprises a wafer count and wafer positions of the batch wafers.

9. The wafer optical inspection method of claim 8, further comprising performing image pre-processing before the image recognition device identifies, wherein the image pre-processing comprises decoding, converting, enhancing, denoising, contrast adjustment, or edge detection for the side image of the wafer group in a region of interest.

10. The wafer optical inspection method of claim 8, wherein the step of identifying the batch wafer data by the image recognition device comprises performing a vector deviation calibration for the side image of the wafer group to obtain more uniform and consistent wafer spacing data, and generating a 2D image of the wafer group based on the wafer spacing data, wherein the 2D image of the wafer group comprises multiple wafer images.

11. The wafer optical inspection method of claim 10, wherein the step of identifying the batch wafer data by the image recognition device further includes applying a wafer confirmation template to the 2D image of the wafer group to form a template matching data, wherein the wafer confirmation template comprises a plurality of wafer slots, each of the wafer slots comprises a slot number and two position confirmation boxes near a bottom and a top of the wafer slot, and the wafer position is confirmed as abnormal based on whether the wafer image in the 2D image overlaps with the position confirmation boxes.

12. The wafer optical inspection method of claim 11, wherein the image recognition device uses the template matching data to identify the current batch wafer data.

13. The wafer optical inspection method of claim 8, further comprising comparing the batch wafer data with a reference data to obtain an identification result, wherein the reference data comes from an automated system's dispatch information, and each wafer batch data is an independent sample, comprising the batch wafer data obtained after completing the previous process or previous transfer of the batch wafers.

14. The wafer optical inspection method of claim 8, wherein the equipment is a wet bench equipment and the process zone is a process tank, and the wet bench equipment comprises a robotic arm to transfer the batch wafers between the different process tanks, and a wafer handling device is provided to transfer the batch wafers to the process tank, and the robotic arm and the wafer handling device transfer the batch wafers at a wafer transfer position above the process tank, and the image capturing device captures the side image of the wafer group when the wafer handling device is positioned at the wafer transfer position.

15. The wafer optical inspection method of claim 14, wherein the wafer position in the batch wafer data is a slot grid of the wafer handling device where the wafer is positioned.

\* \* \* \* \*